United States Patent
Ferry et al.

(10) Patent No.: US 10,775,244 B2
(45) Date of Patent: Sep. 15, 2020

(54) TEMPERATURE SENSOR SYSTEM

(71) Applicant: General Electric Company, Schenectady, NY (US)

(72) Inventors: Allan Ferry, Windsor, CT (US); Philip Frederick Gilston, Burlington, CT (US); Haiyang Qian, Avon, CT (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 206 days.

(21) Appl. No.: 16/112,953

(22) Filed: Aug. 27, 2018

(65) Prior Publication Data

US 2020/0064203 A1    Feb. 27, 2020

(51) Int. Cl.
     *G01K 1/14*      (2006.01)
     *G01K 7/02*      (2006.01)
     *G01K 13/00*      (2006.01)

(52) U.S. Cl.
     CPC .............. *G01K 1/143* (2013.01); *G01K 7/02* (2013.01); *G01K 13/00* (2013.01)

(58) Field of Classification Search
     CPC   G01K 1/08; G01K 13/02; G01K 1/14; G01K 7/02; G01K 1/16; G01K 1/143; G01K 13/00; F28F 2200/005
     USPC ........ 374/163, 141, 208, 100, 147; 73/866.5
     See application file for complete search history.

(56) References Cited

U.S. PATENT DOCUMENTS

| | | | | |
|---|---|---|---|---|
| 2,048,680 A | * | 7/1936 | Bird | G01K 1/10 136/232 |
| 2,302,640 A | * | 11/1942 | Schmidt | G01K 1/143 374/194 |
| 2,491,023 A | * | 12/1949 | Alles | G03C 1/795 430/536 |
| 2,971,998 A | | 2/1961 | Thomas | |
| 4,338,479 A | | 7/1982 | Bauman | |
| 4,477,687 A | | 10/1984 | Finney | |
| 4,515,484 A | | 5/1985 | Gilley | |

(Continued)

FOREIGN PATENT DOCUMENTS

| JP | 05010835 | 2/1993 |
|---|---|---|
| JP | 3782958 | 6/2006 |

OTHER PUBLICATIONS

International Search Report dated Dec. 5, 2019 in corresponding PCT Application No. PCT/US2019/047387.

*Primary Examiner* — Gail Kaplan Verbitsky
(74) *Attorney, Agent, or Firm* — Grogan, Tuccillo & Vanderleeden, LLP

(57) ABSTRACT

A temperature measurement system for very high temperature vessels is disclosed. The system includes a vessel to contain a heated gas therein. The vessel includes a wall having an inner side proximal to the heated gas, and an opposing outer side distal from the heated gas. The wall includes a threaded recess, with a stud having a first threaded portion threadedly engaged in the recess, and a second threaded portion extending outwardly therefrom. A nut is threadedly engaged on the second threaded portion of the stud. A retention plate is between the nut and the outer side of the wall with a first side coupled to the nut, and a second side coupled to outer side of the wall. A temperature sensor is disposed between the second surface of the retention plate and the outer side of the wall and coupled to the outer side of the wall.

23 Claims, 4 Drawing Sheets

(56) References Cited

U.S. PATENT DOCUMENTS

| | | | | |
|---|---|---|---|---|
| 5,070,706 | A | * | 12/1991 | Waters .................... F17C 13/02 374/143 |
| 5,662,418 | A | | 9/1997 | Deak et al. |
| 5,829,880 | A | * | 11/1998 | Diedrich ................ G01K 13/02 374/208 |
| 5,951,165 | A | * | 9/1999 | Platt ........................ G01K 1/16 136/230 |
| 5,993,061 | A | | 11/1999 | Drouet |
| 7,785,003 | B2 | * | 8/2010 | Blichmann ............. G01K 1/14 374/100 |
| 8,337,081 | B1 | * | 12/2012 | Holmberg .............. G01J 5/041 374/121 |
| 9,205,588 | B2 | | 12/2015 | Lin et al. |
| 2004/0233969 | A1 | * | 11/2004 | Welker ................... G01K 13/02 374/148 |
| 2006/0227850 | A1 | * | 10/2006 | Johnson .................. G01K 1/14 374/208 |
| 2008/0205485 | A1 | * | 8/2008 | Takahashi ............... G01K 1/14 374/208 |

* cited by examiner

TEMPERATURE SENSOR SYSTEM

BACKGROUND

Technical Field

Embodiments of the invention relate generally to temperature sensors, and more specifically, to a system and method for attaching a temperature sensor for a boiler.

Discussion of Art

The present invention relates to the field of temperature measurement technology. It is desirable in many industries to monitor the temperature of operating equipment. For example, in the boiler industry it is common to monitor the surface temperature of a pipe to thereby obtain an indication of the temperature of a heated gas contained therein. The temperature of such equipment, including vessels such as pipes, tubes, conduits, manifolds, and the like is often monitored by using thermocouples welded to the surface of the vessel.

A thermocouple typically consists of two wires or leads made of different metals and joined together at a junction. A temperature difference between the respective ends of the leads results in the creation of a potential difference or voltage between them with resulting current flow, and this voltage can be measured. Since the relationship between the resulting voltage and the temperature difference is well known, knowledge of the voltage across the leads and the temperature at one end gives the temperature at the other end. In other instances, other types of known temperature sensors may be used.

Typically, in the operation of various high-temperature equipment such as furnaces, boilers, gas turbines, heat recovery steam generators, and so on, it is known to conduct liquids and gasses at elevated temperatures and pressures within walled vessels such as pipes, tubes, and manifolds. It is necessary to accurately measure the temperature of the pipe material, which also gives an indication of the hot combustion gases conveyed within the pipes associated with the equipment. The temperatures of such gases may range from, a few 100° F. at a start-up condition, to above 1200° F. at a normal operating condition. For this purpose, high temperature sensors such as thermocouples are typically attached by various methods to the surface of the various pipes, tubes, and manifolds to thereby obtain an indication of the temperature of the pipe material and an indirect indication of the temperature of the gas therein. It is necessary that the attachment method provide a robust connection of the thermocouple to the pipe wall. For example, in a conventional boiler, a thermocouple is typically attached by means of a weld connection to the outer surface of a pipe having a heated gas therein.

Such high-temperature equipment are also typically required to be built in accordance with conventional industry standards and codes. For example, the ASME Boiler & Pressure Vessel Code (BPVC) is an American Society of Mechanical Engineers (ASME) industry standard that regulates the design and construction of boilers and pressure vessels. Due to the high temperatures and high pressures typically reached in a boiler during normal operation, the BPVC requires high creep-strength steels, or creep-strength enhanced ferritic steels (CSEF), be used in certain pipes carrying very high-temperature steam. Accordingly, high chromium steel alloys such as P91, P22, and P11 are typically used to form some pipes conveying high temperature, or super-critical steam temperature, gasses therein. Additionally, another BPVC-driven requirement based on these classes of high chromium steel alloys, such as P91 alloys, is that subsequent to any welding operation, such as welding a thermocouple or temperature sensor to the outer surface of such a pipe, a post-weld heat-treating operation must be performed on the pipe. In other cases, a post-weld heat-treating operation must be likewise performed when using other alloys, based on certain wall thicknesses of the vessel. Such post-welding heat-treating operations can add significant cost to the assembly of a conventional boiler employing thermocouples attached by welding. Moreover, these costs can be further increased if the thermocouples need to be subsequently replaced by welding in the field as part of a repair or servicing step.

In some cases, a weld operation may be avoided by attaching the sensor to the surface of the vessel using spring-loaded clamps. In still other cases, a thermocouple assembly may be employed, such as an insert-type thermocouple element with a spring-loaded mechanism, in order to hold the thermocouple firmly against the outside surface of a pipe using spring pressure. However, in such cases, the very high temperatures reached in many boiler and gas turbine applications can exceed certain temperatures and cause an un-tempering of the springs, thereby resulting in an unreliable connection and inaccurate measurement of the surface temperature of the pipe.

It would be desirable therefore, for a temperature sensor system and method of attaching a temperature sensor, such as a thermocouple, to the outer surface of a vessel having high-temperature gas or fluid therein, without welding, and without need of a penetration through the casing or vessel wall, while maintaining a robust coupling of the sensor to the vessel surface, to ensure accurate measurement of a surface temperature, and is in keeping with BPVC and industry requirements.

BRIEF DESCRIPTION

An embodiment of a temperature measurement system is provided. The system includes a vessel, such as a pipe, having an interior space to contain a heated gas or liquid therein. The interior space is defined by a wall having an inner side proximal to the interior space, and an and an opposing outer side, distal from the interior space, having threaded recess defined therein. A stud having a first threaded portion is threadedly engaged in the recess with a second threaded portion of the stud extending outwardly therefrom. A nut is threadedly engaged on the second threaded portion of the stud. A pressure plate is disposed between the nut and the outer side of the wall, having a first surface facing the outer side of the vessel wall, and a second opposing surface coupled to the nut. A temperature sensor is disposed between the first surface of the pressure plate and the outer side of the wall and coupled to the outer side of the wall.

Another embodiment of a temperature measurement system is provided. The system includes a vessel having an interior space to contain a heated gas therein. The interior space is defined by a wall having an inner side proximal to the interior space, and an opposing outer side distal from the interior space, and the wall defines a threaded recess therein. A bolt having a first threaded portion is threadedly engaged in the threaded recess. The bolt also comprises a second portion including a head. A retention plate is disposed between the head and the outer side of the wall. The retention plate has a first side coupled to the bolt head, and a second side facing the outer side of the wall. A temperature sensor is disposed between the second surface of the retention plate and the outer side of the wall and coupled to the outer side of the wall.

DRAWINGS

The present invention will be better understood from reading the following description of non-limiting embodiments, with reference to the attached drawings, herein below:

DETAILED DESCRIPTION

Figure 1:
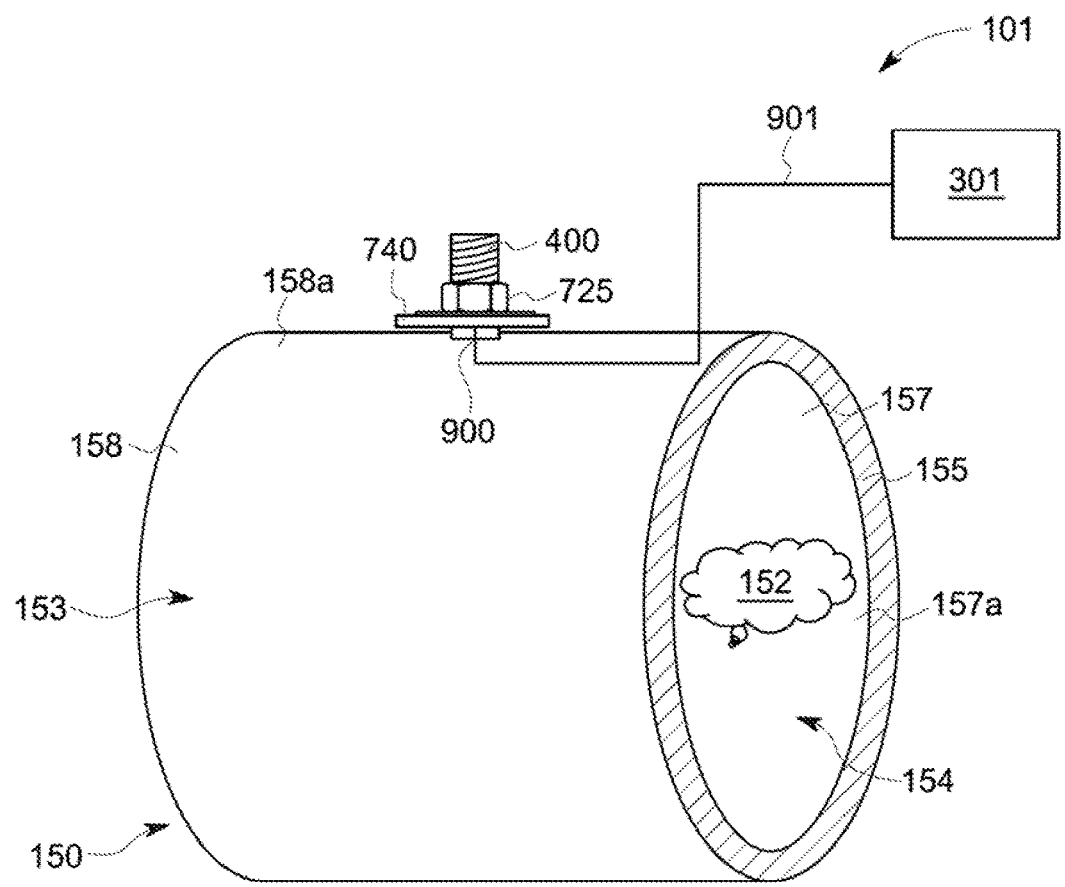
FIG. 1 is a partial cross-sectional view of a temperature sensing system in accordance with an embodiment.
Figure 2:
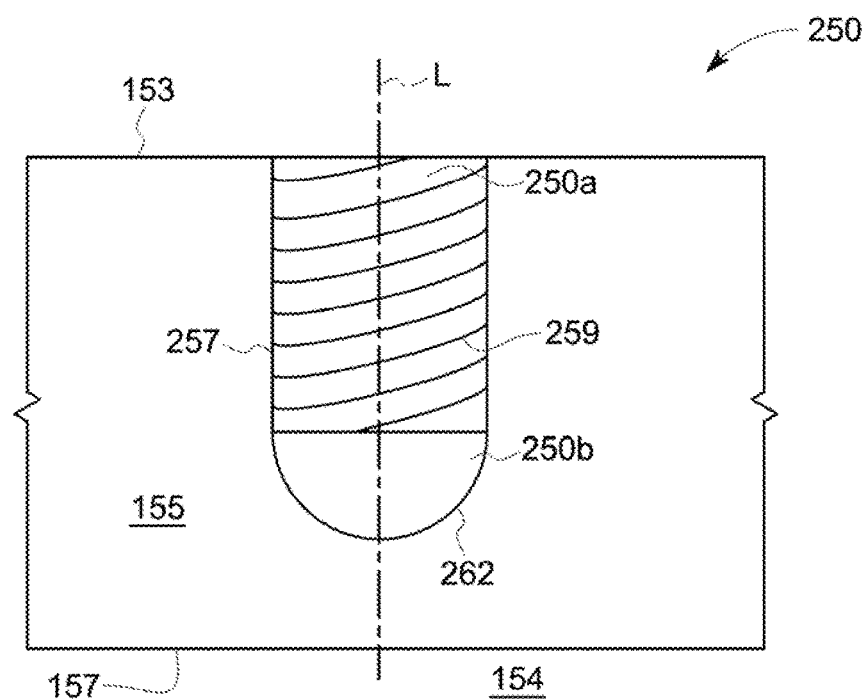
FIG. 2 is a cross-section view of a portion of a vessel, in accordance with an embodiment.
Figure 3:
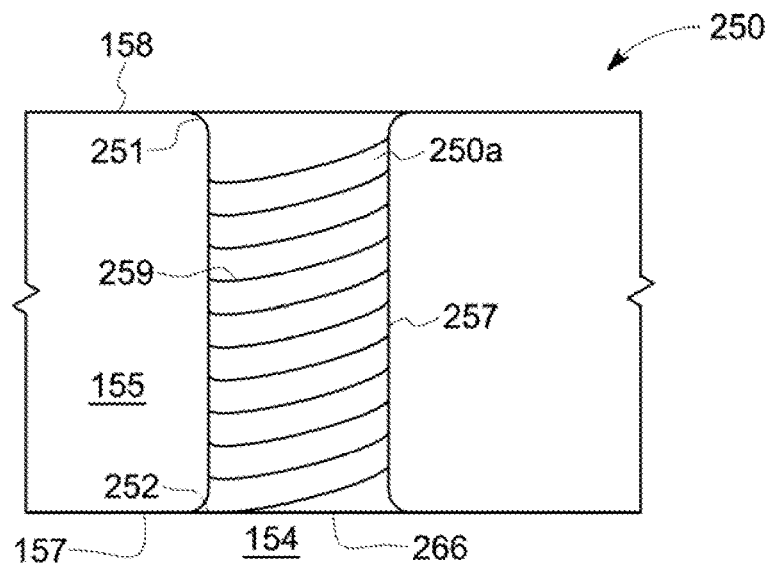
FIG. 3 is a cross-sectional view of a of a portion of a vessel, in accordance with another embodiment.
Figure 4:
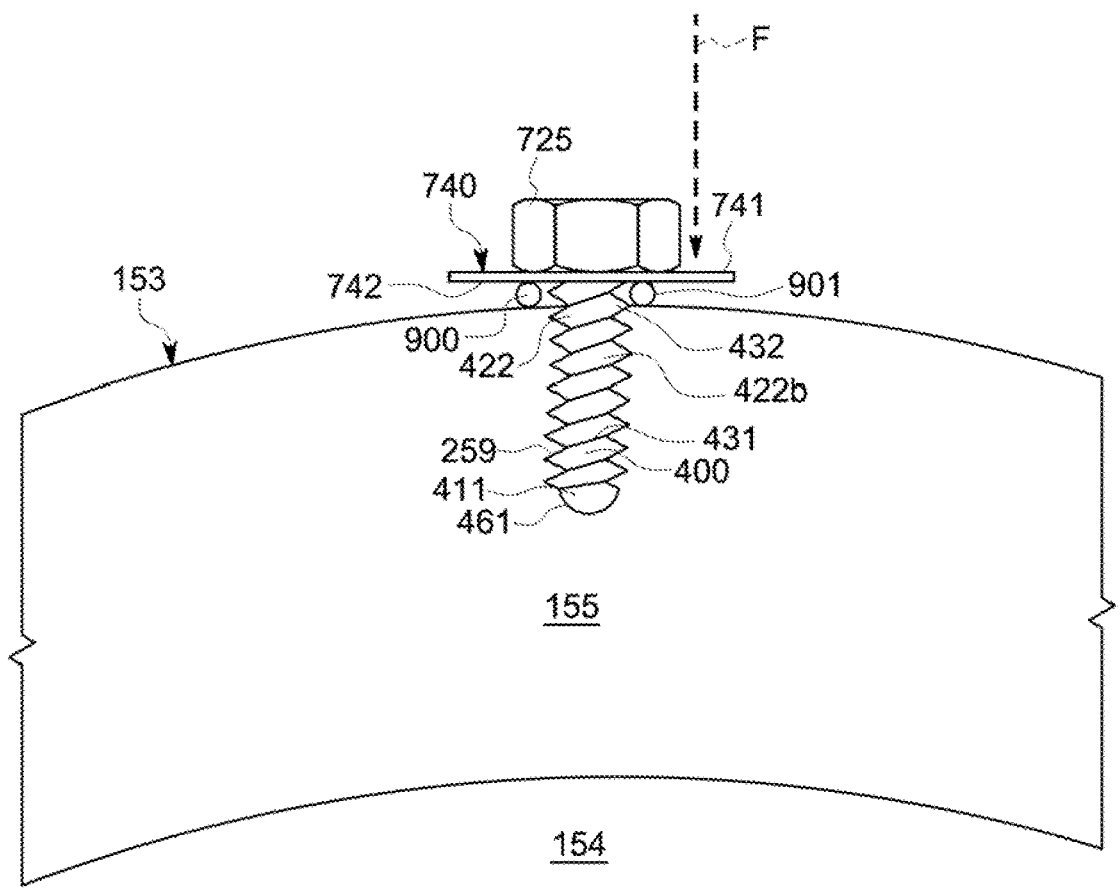
FIG. 4 is a cross-sectional view of a temperature sensing system in accordance with an embodiment.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "coupled," and "connected," mean that the referenced elements are directly or indirectly connected and intervening components may be present.

Additionally, while the embodiments disclosed herein are primarily described with respect to boilers, heat recovery steam generators, and associated steam piping systems, it is to be understood that embodiments of the present invention may be applicable to other apparatus and/or methods that benefit from the teachings herein.

Referring now to FIG. 1, a temperature sensing system 101 in accordance with an embodiment is illustrated. A vessel 150 defines and interior space 154 and is arranged to contain a high-temperature gas 152 or fluid or therein. The interior space 154 is defined by a wall 155. It will be appreciated that the vessel 150 is shown in FIG. 1 in partial cut away for clarity.

In an embodiment, wall 155 is formed from a high creep-strength steel alloy. Unless otherwise stated. as used herein, the term "steel alloy" refers to any steel alloy approved for use by International Standards for Boilers and Pressure Vessels, such as ASME Boiler & Pressure Vessel Code (BPVC). For example, in an embodiment, the vessel wall 155 is formed from P91 steel alloy. In various embodiments, wall 155 may be formed from any steel alloy that allows embodiments of the temperature sensing system to operate as described herein.

The vessel wall 155 comprises an inner side 157 arranged proximal to the interior space 154 and the heated gas 152. The vessel wall 155 also comprises an outer side 158, distal from the interior space 154 and heated gas 152. Accordingly, the inner side 157 may be defined by an inner surface 157a, associated with the interior space 154 of the vessel 150. Likewise, the wall 155 outer side 158 may be defined by an outer surface 158a, associated with an exterior portion 153 of the vessel 150.

It will be appreciated that although wall 155 is depicted in FIG. 1 as generally arcuate, to thereby define a cylindrical vessel 150, the wall 155 and vessel 150 of various embodiments are not so limited, and may comprise any number of shapes or geometries. For example, in other embodiments, the wall 155 may have a curved cross-section and define a vessel 150 that is generally spherical. In other embodiments, wall 155 may have a generally flat cross section and define a vessel 150 having a substantially cubic shape. In various embodiments, vessel 150 and wall 155 may comprise any shape that allows embodiments of the temperature sensing system to operate as described herein. Moreover, vessel 150 may include a plurality of walls 155 that cooperatively define the interior space 154 therein. It is also contemplated that the wall 155 may have any thickness that allows embodiments of the temperature sensing system to operate as described herein. However, it will be appreciated that the vessel wall 155 should at least be of sufficient thickness to withstand the pressures exerted by the gas 152 therein, within the temperature ranges of operation of the system. Moreover, it will also be appreciated that the wall 155 should additionally be of sufficient thickness to enable at least two threads of a threaded stud 400 or bolt 500 to threadedly engage with at least two corresponding threads defined within a threaded recess 250 as described in more detail hereinbelow.

The outer side 158 of wall 155 includes a threaded recess 250 defined therein. The recess 250 may be arranged as a blind hole within wall 155. In other embodiments, the recess 250 may be arranged as a through-hole through wall 155. In an embodiment, the threaded recess 250 defines a cylindrical chamber having a longitudinal axis "L" therethrough. The longitudinal axis "L" may be orthogonal or transverse to a longitudinal axis W defined by wall 155. For example, in an embodiment wherein the vessel 150 comprises a cylindrical pipe having a circular cross-section, the threaded recess 250 is defined in outer surface 153 in the outer side 158 of the wall 155 and oriented radially with respect to the circular cross section of the cylindrical vessel 150. The threaded recess 250 is sized and configured to receive a threaded stud 400 or bolt 500 therein. A first end 250a of recess 250 is open and operative to receive the stud 400 or bolt 500 therethrough.

In an embodiment where recess 250 is arranged as a blind hole within wall 155, a second end 250b of recess 250, opposite the first end 250a, is closed. In such an embodiment the closed second end 250b of recess 250 is operative to receive the first distal end 411 of the stud 400 thereat, as well as to prevent the stud 400 from extending through vessel wall 155 inner side 157 and into the interior space 154. The closed second end 250b of recess 250 within wall 155 may be defined by a surface 262.

Alternatively, in an embodiment where recess 250 is arranged as a through-hole through wall 155, a second end 250b of recess 250, opposite the first end 250a, defines an opening 266 at the vessel wall 155 inner side 157 operative to receive the first distal end 411 of the stud 400 therethrough, and allow the stud 400 to extending through vessel wall 155 inner side 157 and into the interior space 154.

The threaded recess 250 in wall 155 is further defined by an interior surface 257 within wall 155. The interior surface 257 may have a substantially cylindrical shape. In an embodiment, interior surface 257 includes threads 259 formed thereon. The threads 259 are configured to threadedly engage with corresponding threads 431 formed on the first threaded portion 411*a* of threaded stud 400. In other embodiments, the threads 259 are configured to threadedly engage with corresponding threads 531 formed on the first threaded portion 511 of bolt 500.

In various embodiments, the threaded recess 250 defines a first rim portion 251 disposed thereabout on the outer surface 158*a* of outer wall 158. In an embodiment, the rim portion 251 comprises a rounded edge to reduce the stress risers at the first rim portion 251. For example, in an embodiment, the first rim portion 251 has a ⅛ in. radius. In certain embodiments, where recess 250 is arranged as a through-hole through wall 155, the threaded recess 250 may define a second rim portion 252 disposed thereabout opening 266 on the inner surface 157*a* on the inner side 157 of wall 155. In an embodiment, the second rim portion 251 comprises a rounded edge to reduce the stress risers at the rim portion 252. For example, in an embodiment, the second rim portion 252 has a ⅛ in. radius.

In an embodiment, the threaded stud 400 is threadedly engaged with the threads 259 formed within the threaded recess 250. In embodiments, the threaded stud 400 may comprise a threaded rod, while in other embodiments, the threaded stud 400 may comprise a bolt 500 with integrally formed head 525. Generally, the threaded stud 400 is an elongate cylinder having a first end 411 and a second end 422 opposite the first end 411. The threaded stud 400 comprises a first threaded portion 411*a* at a first end of stud 411 having threads 431 disposed thereon, configured to cooperatively engage the threads 259 within threaded recess 250. Threaded stud 400 may additionally comprise a second threaded portion 422*b* at a second end 422 of the stud 400 having threads 432 disposed thereon. In an embodiment, the thread profile of the threads 431 on the first threaded portion 411*a* have the same thread profile as the threads 432 on the second threaded portion 422*b*. In other embodiments, the thread profile of the threads 431 on the first threaded portion 411*a* is different from the thread profile of the threads 432 on the second threaded portion 422*b*.

It will be appreciated that due to the mechanical stresses on the vessel walls created at the expected high temperatures (e.g. about 1200° F.) and pressures at a normal operating condition of certain boiler vessels, it is important to minimize any additional stresses to the vessel when forming the various embodiments. Accordingly, in certain embodiments the threads 259 in threaded recess 250 and the corresponding threads 431 on at least the first threaded portion 411*a* of threaded stud 400 are formed to reduce stress risers associated with sharp edges of conventional threads as used in conventional boiler structures. For example, in embodiments the threads 259, 431 of the recess 250 and first threaded portion 411*a* of stud 400 may comprise knuckle, or round threads. For example, the threads 259, 431 of the recess 250 and first threaded portion 411*a* of stud 400 may be arranged according to industry standard round thread profiles such as DIN 405, DIN 15403, and DIN 2040.

For example, knuckle threads with a flat 30 degree flank thread angle may be used for inch pitches and diameters ranging from 8 mm to 200 mm. For a thread pitch p, the crest and root rounding radius may be slightly less than p/4, and approximately the middle third of each thread flank may be flat. Alternatively, for a thread angle at the flank of −60 degrees, the crest and root rounding radius may be configured to be approximately p/6 for threads of pitch p. In other embodiments for a 0.125 inch thread pitch (8 threads per inch), the round thread root radius may be 0.017 inch, and the crest radius is 0.020 inch.

Due to the rounded edges of the thread profile, the round or knuckle thread advantageously reduces stress risers in the stud 400 and vessel wall 155, while at the same time withstanding the very large forces exhibited at the expected high temperatures and pressures of boiler vessels. In other embodiments, other thread profiles, such as sinusoidal thread profiles, or half-circle thread profiles, may be employed.

Additionally, the first end 411 of threaded stud 400 defines a first distal end 461. In embodiments where recess 250 is arranged as a blind hole in wall 155, the first distal end 461 of stud 400 and the surface 262 of closed second end 250*b* of recess 250 are arranged to have corresponding geometries to maximize the mating surface areas between the first distal end 461 of stud 400 and the surface 262. In an embodiment, the first distal end 461 is formed to have a hemispherical geometry. For example, the hemispherical geometry may define a rounded cross-section at the tip of first distal end 461. In an embodiment, the radius of the rounded cross-section tip at first distal end 461 is substantially equal to 66% of the diameter of the first end 411 of threaded stud 400. In certain embodiments, where the first distal end 461 of stud 400 has a curved geometry, and where recess 250 is arranged as a blind hole in wall 155, then the surface 262 of closed second end 250*b* of recess 250 may likewise comprise a curved or rounded geometry corresponding to the cross-section of the tip of first distal end 461 of stud 400 to nestingly receive the tip of first distal end 461 thereat. In other embodiments, other geometries at the first distal end 461 may be employed. By configuring the tip of the first distal end 461 of stud 400 to be nested or fit against the closed second end surface 262 of recess 250 enables an improved thermal transfer between the vessel wall 155 and stud 400 while at the same time reducing stress risers caused by sharp or squared edges.

The rounded cross-section of the tip at first distal end 461 and the corresponding rounded cross-section of the surface 262 of closed second end 250*b* of recess 250 reduces stress risers in the stud 400 and vessel wall 155, while at the same time withstanding the very large forces exhibited at the expected high temperatures and pressures of boiler vessels, and providing improved thermal transfer between the vessel wall 155 and stud 400.

Additionally, the first end 511 of bolt 500 defines a first distal end 561. In embodiments where recess 250 is arranged as a blind hole in wall 155, the first distal end 561 of bolt 500 and the surface 262 of closed second end 250*b* of recess 250 are arranged to have corresponding geometries to maximize the mating surface areas between the first distal end 561 of bolt 500 and the surface 262. In an embodiment, the first distal end 561 is formed to have a hemispherical geometry. For example, the hemispherical geometry may define a rounded cross-section at the tip of first distal end 561. In an embodiment, the radius of the rounded cross-section tip at first distal end 561 is substantially equal to 66% of the diameter of the first end 511 of bolt 500. In certain embodiments, where the first distal end 561 of bolt 500 has a curved geometry, and where recess 250 is arranged as a blind hole in wall 155, then the surface 262 of closed second end 250*b* of recess 250 may likewise comprise a curved or rounded geometry corresponding to the cross-section of the tip of first distal end 561 of bolt 500 to nestingly receive the tip of first distal end 561 thereat. In other embodiments, other geometries at the first distal end 561 may be employed. By configuring the tip of the first distal end 561 of bolt 500 to be nested or fit against the closed second end surface 262 of recess 250 an improved thermal transfer is enabled between the vessel wall 155 and bolt 500 while at the same time reducing stress risers caused by sharp or squared edges.

The rounded cross-section of the tip at first distal end 561 and the corresponding rounded cross-section of the surface 262 of closed second end 250*b* of recess 250 reduces stress risers in the bolt 500 and vessel wall 155, while at the same time withstanding the very large forces exhibited at the expected high temperatures and pressures of boiler vessels, and providing improved thermal transfer between the vessel wall 155 and bolt 500.

Figure 5:
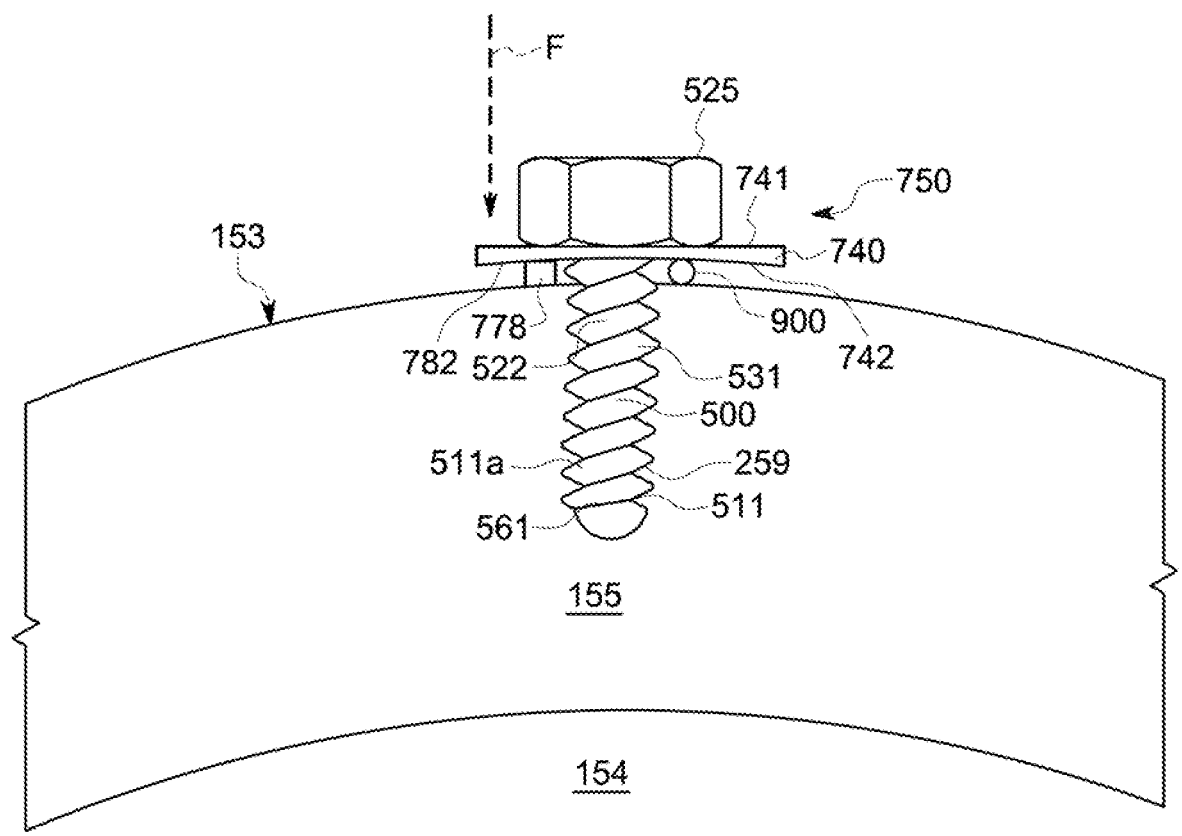
FIG. 5 is a cross-sectional view of a temperature sensing system in accordance with an embodiment.
Figure 6:
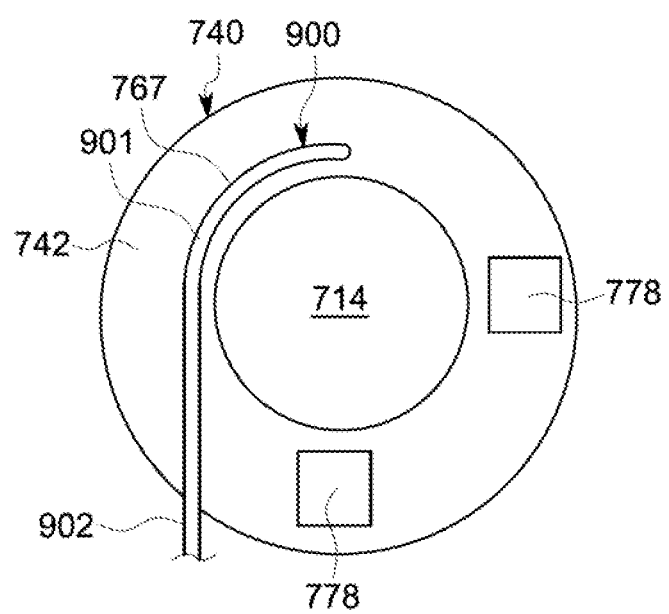
FIG. 6 is a view of a retention plate of a temperature sensing system in accordance with an embodiment.
Figure 7:
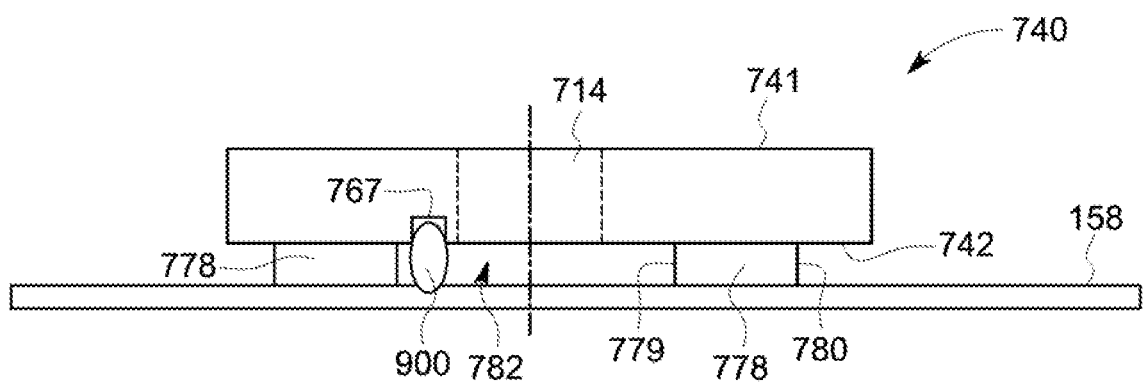
FIG. 7 is a cross-sectional view of a retention plate of a temperature sensing system in accordance with an exemplary embodiment.

In various embodiments, a retention assembly 750 (FIG. 5) is arranged to couple a temperature sensor 900 to the vessel 150 by applying a mechanical retention force "F" to temperature sensor 900 disposed therebetween. The temperature sensor 900 may comprise a wire 901 to convey a signal indicative of the temperature detected by sensor 900 to instrumentation or circuitry 301 in a known manner. By applying a strong retention force F to couple the temperature sensor 900 to the vessel 150, accurate and reliable indication of the temperature of the vessel may be obtained without need of welding the temperature sensor 900 to vessel 150.

For example, in an embodiment, the retention assembly 750 may comprise a threaded nut 725 threadedly engaged on the second threaded portion 422*b* of stud 400, and a retention plate 740, disposed between the threaded nut 725 and the vessel 150. The nut 725 is arranged to cooperate with the threaded stud 400 and the retention plate 740 to apply the retention force F on the temperature sensor 900 in the direction of vessel 150 as the nut 725 is advanced or tightened on the stud 400. For example, in an embodiment, the retention plate 740 includes an aperture 714 defined therethrough. The aperture 714 is sized and disposed to receive the stud 400 or bolt 500 therethrough. The retention plate 740 is coupled to and responsive to movement of the nut 725. As the nut 725 is advanced or tightened on stud 400, the retention plate 740 driven toward vessel 150 by the nut 725. The retention plate 740 comprises a first side 741 facing and in mechanical communication with the nut 725. The retention plate 740 also comprises a second side 742 opposite the first side 741 and facing vessel 150.

In an embodiment, the temperature sensor 900 is disposed between the vessel 150 and the second side 742 of retention plate 740. As the nut 725 is tightened on stud 400, the nut 725 applies a net retention force F in the direction of vessel 150 to the retention plate 740 which is then transmitted by the retention plate 740 to the temperature sensor 900 in the direction of vessel 150 thereby coupling the temperature sensor to the vessel 150 without welding.

Alternatively, in an embodiment, the temperature sensor 900 is rigidly coupled to any surface of the retention plate 740. The sensor 900 may be coupled using any number of known techniques for coupling a sensor to a surface, such as for example, welding, staking, or by use of an adhesive to retention plate 740.

In another embodiment, the stud 400 and nut 725 may be integrally formed to define a bolt 500 having a bolt head 525. Generally, the bolt 500 is an elongate cylinder having a first end 511 and a second end 522 opposite the first end 511. The bolt 500 comprises a first threaded portion 511*a* at the first end 511 of bolt 500 having threads 531 disposed thereon. configured to cooperatively engage the threads 259 within threaded recess 250.

The retention plate 740 is coupled to and responsive to movement of the bolt head 525, such that as the bolt 500 is advanced or tightened into the threaded hole 250, the retention plate 740 driven toward the vessel 150. The bolt head 525 is arranged to cooperate with the retention plate 740 to apply a retention force on the temperature sensor 900 in the direction of vessel 150. The retention plate 740 is coupled to and responsive to movement of the bolt head 525. As the bolt 500 is advanced or tightened into the threaded hole 250, the retention plate 740 driven toward vessel 150 by the bolt head 525. The retention plate 740 comprises a first side 741 facing and in mechanical communication with the bolt head 525. The retention plate 740 also comprises a second side 742 opposite the first side 741 and facing vessel 150. The temperature sensor 900 is disposed between the vessel 150 and the second side 742 of retention plate 740. As bolt 500 is advanced or tightened into the threaded hole 250, the bolt head 525 applies a net retention force F in the direction of vessel 150 to the retention plate 740 which is then transmitted by the retention plate 740 to the temperature sensor 900 in the direction of vessel 150. In some embodiments, an additional plate (not shown), such as a washer, may be disposed between the bolt head 525 and the first side 741 of retention plate 740.

In other embodiments, the temperature sensor 900 may directly coupled to a surface of the retention plate, for example by welding, staking, bonding, or gluing. In such embodiments, the retention plate 740 is secured to the vessel 150 by a threaded fastener such as the bolt 500 or the stud 400 and nut 725, such that as the bolt 500 is advanced or tightened into the threaded hole 250, (or the nut 725 is advanced or tightened on stud 400), the retention plate 740 is driven toward the vessel 150. The bolt head 525 or nut 725 is thereby arranged to apply a retention force F on the retention plate 740 in the direction of vessel 150 to ensure a robust mechanical connection between the retention plate 740 and outer surface 153 to enable efficient thermal transfer between the vessel wall 155 and the retention plate 741. The retention plate 740 comprises at least a first side 741 facing and in mechanical communication with the bolt head 525 or nut 725. The retention plate 740 also comprises at least a second side 742 opposite the first side 741 and facing vessel 150. The temperature sensor 900 may be coupled to the first, second, 741, 742, or any other any convenient surface of the retention plate 740. In some embodiments, an additional plate (not shown), such as a washer, may be disposed between the bolt head 525 or nut 725 and the second side 742 of retention plate 740.

In other embodiments, the retention plate 740 and nut 725 or bolt head 525 may be integrally formed or fixedly coupled together. In still other embodiments, the retention assembly 750 comprising the stud 400, nut 725 and retention plate 740 may be integrally formed to operate as described herein.

The second side of retention plate 742 may define a generally flat or planar surface. In some embodiments, (e.g., when the outer surface 153 in the outer side 158 of the wall 155 comprises a curved surface), the second side of retention plate 742 may likewise define a corresponding curved surface between the outer surface 153 of the wall 155 and the second side of retention plate 742, wherein the corresponding curved surfaces 742, 153 are arranged parallel with respect to each other to reduce the chance of temperature sensor 900 moving due to mechanical stresses on any of the components. In embodiments, the second side of retention plate 742 defines a curved profile having a radius substantially identical to the radius of the outer surface 153 in the outer side 158 of the wall 155.

The second side 742 of retention plate 740 may further comprise a recess 767 defined therein. The recess 767 is sized to receive at least a portion of the temperature sensor 900, and/or one or more wires 901 associated with the temperature sensor, therein. For example, the recess 767 may comprise a groove defined in a surface of the second side 742 of retention plate 740. The recess 767 accommodates therein a depth associated with at least one of the temperature sensor 900 and the associated wire 901. In an embodiment, the portion of the temperature sensor 900 and associated wiring 901 disposed between the retention plate 740 and vessel define a first sensor portion 901 and a second portion 902. The first portion may be received within the recess 767, while a second portion 902 is not received within the recess 767. In another embodiment, both the first and second portions 901, 902 are received within the recess 767. Disposing at least a portion of at least one of the first and second portions 901, 902 within recess 767 effectively reduces or minimizes any gap defined between the second side 742 of retention plate 740 and the vessel 150, when the temperature sensor 900 is disposed therebetween, while still maintaining a secure connection between the temperature sensor 900 and the vessel 150. In embodiments, the recess 767 prevents movement of sensor 900 away from vessel 150 and increases heat transfer to the sensor by providing more surface area contact with the sensor 900.

In an embodiment, the groove 767a comprises an arcuate geometry disposed radially about the stud 400. Embodiments comprising an arcuate groove 767a having the temperature sensor 900 and/or wiring 901 disposed therein will reduce tensile stress applied to the sensor 900 and wiring 901 during installation and when tightening the nut 725, while retaining the temperature sensor 900 in a fixed position with respect to the retention assembly 750.

In other embodiments, the second side 742 of retention plate 740 may further comprise a plurality of projections or boss portions 778 defined thereon. The boss portions 778 may be radially distributed about the second side 742 of retention plate 740. For example, each boss portion 778 may comprise a base portion 779 coupled to the second side 742 of retention plate 740, and a distal portion 780, opposite the base portion selectively couplable to the vessel 150. In an embodiment a length of each boss portion 778, (i.e, between the base portion 779 and the distal portion 780) defines a gap 782 between the second side 742 of retention plate 740 and the vessel 150. In an embodiment, the length of gap 782 is substantially equal to a thickness of the temperature sensor 900 and/or wiring 901. In another embodiment, the length of gap 782 is substantially equal to a thickness of the portion of temperature sensor 900 and/or wiring 901 that is not received within the recess 767. In an embodiment, the boss portions 778 are arranged to be spaced from the temperature sensor 900 and the associated wiring 901 to provide for an even distribution about the retention plate 740 of the retention force F in the direction of vessel 150 when the temperature sensor 900 is disposed therebetween, while still maintaining a secure connection between the temperature sensor 900 and the vessel 150.

While only certain preferred features of the invention have been illustrated and described, many modifications and changes will occur to those skilled in the art. It is, therefore, to be understood that the appended claims are intended to cover all such modifications and changes as fall within the true spirit of the invention.

While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "above," "below," etc. are used merely as labels, and are not intended to impose numerical or positional requirements on their objects. Further, the limitations of the following claims are not written in means-plus-function format and are not intended to be interpreted as such, unless and until such claim limitations expressly use the phrase "means for" followed by a statement of function void of further structure.

This written description uses examples to disclose several embodiments of the invention, including the best mode, and to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims As used herein, an element or step recited in the singular and proceeded with the word "a" or "an" should be understood as not excluding plural of said elements or steps, unless such exclusion is explicitly stated. Furthermore, references to "an embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A temperature measurement system, comprising:
 a vessel having an interior space, the interior space defined by a wall having an inner side proximal to the interior space, and an opposing outer side distal from the interior space, the wall defining a threaded recess;
 a threaded stud having a first threaded portion threadedly engaged in the threaded recess, and a second threaded portion extending outwardly therefrom;
 a nut threadedly engaged on the second threaded portion of the stud:
 a retention plate disposed between the nut and the outer side of the wall, having a first side coupled to the nut, and a second side facing the outer side of the wall; and a temperature sensor disposed between the second surface of the retention plate and the outer side of the wall and coupled to the outer side of the wall.

2. The temperature measurement system of claim 1, wherein the threads of the threaded recess, and the corresponding threads of the first threaded portion, define round thread profiles.

3. The temperature measurement system of claim 2, wherein of the threads of the second threaded portion define the same thread profile as the threads of the first threaded portion.

4. The temperature measurement system of claim 1, wherein the threaded recess defines a cylindrical chamber having a longitudinal axis "L" therethrough orthogonal to a longitudinal axis defined by the wall.

5. The temperature measurement system of claim 1, wherein the threaded recess defines a through hole.

6. The temperature measurement system of claim 1, wherein the threaded recess defines a blind hole.

7. The temperature measurement system of claim 5, wherein the stud further comprises a first distal end defining a curved cross-sectional profile; and
the blind hole comprises a surface defining a closed second end, wherein the surface of closed second end defines a curved cross-sectional profile corresponding to the profile of the first distal end of the stud to receive the first distal end thereat.

8. The temperature measurement system of claim of claim 1, wherein the nut and the retention plate are integrally formed.

9. The temperature measurement system of claim 1 wherein the wall comprises a curved surface defining a first radius; and
the second side of retention plate defines a curved surface defining a second radius, wherein the first radius and second radius are substantially identical.

10. The temperature measurement system of claim 1, wherein the second side of retention plate comprises a recess defined therein sized to operatively receive at least a portion of the temperature sensor therein.

11. The temperature measurement system of claim 10, wherein the recess defines a generally arcuate groove.

12. The temperature measurement system of claim 10, wherein the second side of retention plate further comprises a raised portion projecting therefrom and coupled to the outer side of the wall.

13. The temperature measurement system of claim 12, wherein the threads of the threaded recess, and the corresponding threads of the first threaded portion, define round thread profiles.

14. The temperature measurement system of claim 12, wherein the threaded recess defines a cylindrical chamber having a longitudinal axis "L" therethrough orthogonal to a longitudinal axis defined by the wall.

15. The temperature measurement system of claim 12, wherein the threaded recess defines a through hole.

16. The temperature measurement system of claim 12, wherein the threaded recess defines a blind hole.

17. The temperature measurement system of claim 16, wherein the bolt further comprises a first distal tip defining a hemispherical profile; and
the blind hole comprises a surface defining a closed second end, wherein the surface of closed second end defines a hemispherical cross-sectional profile corresponding to the profile of the first distal tip of the bolt to receive the first distal tip thereat.

18. The temperature measurement system of claim of claim 12, wherein the head and the retention plate are integrally formed.

19. The temperature measurement system of claim 12 wherein the wall comprises a curved surface defining a first radius; and
the second side of retention plate defines a curved surface defining a second radius, wherein the first radius and second radius are substantially identical.

20. The temperature measurement system of claim 12, wherein the second side of retention plate comprises a recess defined therein sized to operatively receive at least a portion of the temperature sensor therein.

21. The temperature measurement system of claim 20, wherein the recess defines a generally arcuate groove.

22. The temperature measurement system of claim 20, wherein the second side of retention plate further comprises a raised portion projecting therefrom and coupled to the outer side of the wall.

23. A temperature measurement system, comprising:
a vessel having an interior space, the interior space defined by a wall having an inner side proximal to the interior space, and an opposing outer side distal from the interior space, the wall defining a threaded recess;
a bolt having a first threaded portion threadedly engaged in the threaded recess, and a second portion extending outwardly therefrom, the second portion comprising a head;
a retention plate disposed between the head and the outer side of the wall, having a first side coupled to the head, and a second side facing the outer side of the wall; and
a temperature sensor disposed between the second surface of the retention plate and the outer side of the wall and coupled to the outer side of the wall.

* * * * *